United States Patent Office 3,375,208
Patented Mar. 26, 1968

3,375,208
METHOD FOR PREPARING A MICROPOROUS
THERMOPLASTIC RESIN MATERIAL
Joseph C. Duddy, Trevose, Pa., assignor to ESB
Incorporated, a corporation of Delaware
No Drawing. Continuation-in-part of application Ser. No.
267,366, Mar. 22, 1963. This application July 26, 1967,
Ser. No. 655,996
18 Claims. (Cl. 260—2.1)

ABSTRACT OF THE DISCLOSURE

A method for preparing a microporous thermoplastic resin material by treating a thermoplastic resin composition with a leaching solvent to remove one or more pore forming agents. A solid, particulate thermoplastic resin which is insoluble in the leaching solvent is intimately mixed under heat and pressure with a solid, particulate thermoplastic resin which is soluble in the leaching solvent to soften the resins into a plasticized mass. The melt is shaped and then contacted with the leaching solvent to remove substantially all of the soluble thermoplastic resin, thereby rendering the insoluble resin microporous. The thermoplastic resin composition can be loaded with filler material, and an additional pore forming agent can be incorporated into the resin composition to provide an exceptionally large pore volume upon removal of the pore forming agents.

---

This patent application is a continuation-in-part of my pending United States patent application Ser. No. 267,366, filed Mar. 22, 1963, now abandoned, which was a continuation-in-part of the now abandoned patent application Ser. No. 818,515, filed on June 8, 1959, and I hereby claim priority for all subject matter disclosed in said prior applications which is also disclosed in this application.

Background of the invention

There are several methods currently employed to produce microporous thermoplastic materials. Several different types of pore forming materials are used, including both particulate and fibrous pore formers. Some of the methods utilize solvents to facilitate the mixing of the thermoplastic resin and the pore forming material. These methods and the products produced thereby have several disadvantages. The solvents which are often used are expensive and hazardous and in most instances require special equipment for recovery and reuse. The use of particulate and fibrous pore formers limits the amount of filler material which can be incorporated in the thermoplastic resin because of strength and handleability requirements. Many of the microporous materials produced by these prior art processes have limited usefulness because of their low pore volume, mechanical strength and poor handleability characteristics.

In addition to preparing microporous thermoplastic materials by removing pore forming agents therefrom, microporous plastics are also prepared by sintering thermoplastic particles. The micropores are formed by the interstices between the particles which are preserved during the sintering operation. If the plastic particles are compaced and densified during the sintering operation producing a non-uniform product, an inert matrix material may be used to disperse the plastic particles while they are being sintered.

Microporous thermoplastic materials are suited because of their physical characteristics to many uses and accordingly, it should be understood that the novel methods of the present invention, though they may be described in connection with the production of an article adapted for a specific use, are adapted to the production of articles suited for other uses requiring similar physical characteristics. For example, microporous thermoplastic materials are suitable for use as wearing apparel, coatings for fabrics, bandages and storage battery separators to mention but a few. When such materials have distributed therethrough other materials such as ion exchange polymers, they are suitable for use in electrolytic systems for the purification of saline and brackish waters and other systems of electrodialysis.

Permselective membranes or diaphragms adapted for use in commerical electrolytic processes and in the deionization of fluids are known in the art. For example, I disclose and claim a permselective diaphragm in my U.S. Patent No. 2,965,697, in which a solid polyelectrolyte is produced in a continuous phase throughout a porous carrier. As disclosed and claimed in that patent, a porous carrier, such as a microporous polyethylene, is impregnated with the monomeric ingredients of an ion exchange resin which is then polymerized in situ within the porous carrier, to such a degree of homogeneity that there is produced a transparent membrane. Another method of making ion exchange diaphragms is disclosed in the patent to G. W. Bodamer, No. 2,681,319. In this patent, the ion exchange material is uniformly dispersed through the thermoplastic resin as by milling. The milled material is then shaped to produce sheet material of the desired thickness. However produced, ion exchange diaphragms are generally characterized by substantial dimensional changes and swelling when placed in electrolytes. As a result, the matrices in which such ion exchange resins are found are stressed and if the membranes are dried, they become brittle and crack. Accordingly, such membranes are generally required to be maintained in a wet or very humid state to maintain dimensional stability and strength.

Summary of the invention

The present invention is characterized by the use of a first solid, particulate thermoplastic resin, which is insoluble in a leaching solvent, in admixture with a second solid, particulate thermoplastic resin, which is soluble in the leaching solvent, to produce microporous materials in which the soluble resin is removed at the completion of manufacture to leave a porous structure comprised of the insoluble thermoplastic resin. In accordance with one embodiment of the present invention, a soluble thermoplastic resin and an insoluble thermoplastic resin are worked under heat and pressure to soften the resins into a plasticized viscous mass. It should be noted that the mixing process is carried out in the absence of any plasticizers and/or solvents, and the particulate nature of both resinous starting materials is destroyed by phase change during the hot mixing operation. After a time interval adequate for the thorough and intimate mixing of the two resins, the mixture may then be shaped, as by calendering or extruding, to produce the material having the desired dimensional characteristics. For example, if it is desired to produce sheet material, the mixture may be shaped by calendering. After the calendering operation, the sheet material may be subjected to a bath in a suitable solvent to remove the soluble resin phase, leaving the insoluble resin porous. In this manner, the soluble resin, by virtue of its thermoplasticity and resinous nature, provides the extra strength needed to give the material handleability during manufacture and upon its removal at the completion of manufacture, by virtue of its solubility, the porosity required of the material.

Detailed description

The products produced by the method of this invention are thermally stable, microporous thermoplastic resin structures which have utility in many applications such as those mentioned above. It was very surprising to discover that the products of this invention may be in the form of matted fibers which are produced in situ, and thereby eliminating the necessity for prior formation of fibers and later weaving them or placing them in mat form. In order to produce such a matted, fibrous product, it is essential that the soluble and insoluble thermoplastic resins be substantially incompatible and thoroughly admixed to form a plasticized viscous mass. In addition, the microporous thermoplastic resin structures are thermally stable up ot temperatures approximating the melting or softening temperature of the resin.

When it is desired to disperse a filler material, such as an ion exchange polymer pore forming agent or graphite, in the resin composition, it may be added to the plasticized resins following their admixing. After a time interval adequate for the thorough and intimate mixing of the filler material and the thermoplastic resins, the mixture may be shaped as described before. Following the shaping, the soluble resin phase may be leached from the shaped material to leave filler material dispersed in a porous resin matrix. When an additional pore forming agent is incorporated into the plasticized resins, it may be leached simultaneously with the removal of the soluble resin (provided it is soluble in the initial leaching solvent) or the mass may be treated with a second leaching solvent to remove one of the pore formers. In this manner, a microporous resin material having exceptionally high pore volume can be produced. In accordance with still another embodiment of the present invention, the ratio of the soluble resin phase to the permanent resin phase is made such that the interstitial pores developed by the removal of the soluble resin phase are such as to accommodate precisely the volumetric increases of the ion exchange resin upon its conversion to a salt form to approximate a continuous phase ion exchange membrane.

The use of a soluble thermoplastic resin as a pore forming agent can be readily contrasted with the sole use of prior art pore forming agents such as starch, salt and the like which contribute nothing to the strength of the material during manufacture. This is particularly true where another material in granular form is to be distributed throughout a porous matrix, since such prior art pore forming agents substantially decrease the amount by which the permanent resin phase may be loaded with such granular material. The soluble resin phase, in accordance with the present invention, acts as a supplementary elastic binder until its removal to form pores. When used in combination with a conventional pore forming agent such as sugar or salt, the soluble resin binder-pore former provides exceptionally large pore volume. Since there is a maximum filler/binder ratio which is suitable for processing, the pore volume is greatly increased by having a binder material which also functions as a pore former.

In carrying out the present invention, the combination of resins utilized must be chosen with the following criteria in mind. First, both resins must be thermoplastic and have substantially similar properties in the plastic state. In this respect, it is desirable that the resins have similar viscosities in the plastic state and that they become plastic within temperature ranges which overlap to an extent permitting the mixing of the resins in their plastic states without substantially degrading the resin with the lower temperature of plasticization. Secondly, the two resins must be substantially incompatible, that is, that after admixture in their thermoplastic states, they exist as separate and distinct phases in the product. Thirdly, one resin must be readily soluble in a solvent in which the other resin is substantially insoluble.

As a result of the incompatibility of the thermoplastic resins utilized in the present invention and the intimate milling and blending thereof, there is produced a thermoplastic material having thread-like pores of capillary size upon the removal of the soluble resin phase. The pores thus formed are uniformly distributed throughout the permanent resin phase, and of a size much less than the particle size of the usual filler materials. As a result, particulate filler materials may be retained in the permanent resin phase when the soluble resin phase is removed by leaching. Measurements have shown that the pores developed by the removal of the soluble resin phase are generally less than one micron in size. As a consequence of the microporosity thus developed and the resiliency of the permanent phase utilized, the microporous material produced in accordance with the present invention swells when placed in the leaching solvent. This swelling can be attributed to the capillary expansion of the porous matrix, providing still greater porosity.

By way of specific example, the following are some of the resins which may be utilized as the permanent or insoluble resin phase; polyethylene, polypropylene, polystyrene, and polyvinyl chloride. The following water soluble thermoplastic resins are extremely advantageous from the economic point of view for use as the temporary soluble thermoplastic phase: polyethylene oxide, polyethylene glycol and polyvinyl pyrrolidone. It should be understood, however, that it is not necessary that the soluble thermoplastic resin utilized as the temporary pore forming agent be water soluble.

Other objects and advantages of the present invention will be readily apparent from the following detailed description of embodiments thereof.

*Example I*

In accordance with one embodiment of the present invention, there is intimately mixed under heat and pressure on a rubber or plastic processing mill, one part by weight of polyethylene in pellet form, which will comprise the permanent resin phase of a microporous material and one part by weight of polyethylene oxide which will serve as a pore forming agent. My specific preference for polyethylene is Alathon 14. The preferred form of polyethylene oxide is Polyox, type WSR–35. The intimate mixing under heat and pressure may be accomplished in an intensive mixer. A temperature of from about 220° F. to about 250° F. has been found suitable for plasticizing these resins. After the plasticization and admixing of the two thermoplastic resins has been completed, they may be removed from the mill and shaped to produce a material having the desired dimensional characteristics. If it is desired to produce sheet material, this may be achieved in a calendering operation at a temperature of about 250° F. Those skilled in the art will understand how to select the time required for plasticizing the thermoplastic resins and also the time required to produce the intimate admixing of the resins described above. For the particular resins described, a time on the order of about 2 to 3 minutes has been found satisfactory.

Following the shaping operation, the soluble resin phase may be leached from the shaped material by passing it through a bath of a solvent in which the temporary thermoplastic resin is soluble and the permanent thermoplastic resin is insoluble. When polyethylene oxide is utilized as the temporary resin phase, water may be used as the solvent. Immersion in a water bath for about ½ hour to about 4 hours has been found satisfactory to completely leach the polyethylene oxide from the polyethylene matrix. In water, polyethylene oxide resin particles pass into the solution in long polymer chains which exude easily from the sheet material leaving a porous matrix of the insoluble polyethylene.

In accordance with the method of the present invention, the porosity of the permanent resin phase is dependent in part on the ratio of the soluble thermoplastic resin phase to the insoluble thermoplastic resin phase, and to a larger degree, upon the increase of interstitial volume in the permanent resin phase by reason of swelling due to capillary action. The small pores produced by the removal of the soluble resin phase have been found to be thread-like, and on the average are less than about one micron in diameter. As a result of the extremely small size of these pores and the resiliency of the permanent resin matrix, the material swells upon the removal of the soluble resin phase due to the force exerted on the pore as well as by the surface tension of the leaching solvent. This swelling further increases the porosity of the permanent resin matrix.

The desired porosity depends primarily on the ultimate use and physical strength requirements. The porosity which can be achieved depends primarily on the ability to efficiently handle the article in production. In accordance with the procedures of this example, the porosity of the porous material is controlled primarily by the ratio of the insoluble resin phase to the soluble resin phase.

*Example II*

In accordance with another embodiment of the present invention, a porous matrix of polyethylene was produced having distributed therethrough particles of methylcellulose. This material is suitable for use in a Lechanche type dry cell as a component of the electrode separation system. In such a system, the partial solvation of the cellulosic constituent, by the cell electrolyte, results in a gel structure suitably disposed for absorbing electrolyte in a correct physical relationship with respect to the active materials of the cell.

The porous material described above was produced by intimately mixing under heat and pressure, one part by weight of polyethylene and one part by weight of polyethylene oxide to produce a plasticized mass. Into this plasticized mass were introduced 4 parts by weight of methylcellulose having a viscosity of 1500 cps. After a time interval adequate for the thorough and intimate mixing of the methylcellulose into the plasticized resins, the plasticized mass was removed from the mixer and calendered into sheets or films 0.005 inch thick. Following the sheeting, the polyethylene oxide phase was removed from the matrix by a water bath.

The film thus produced was then immersed in an electrolyte consisting of 22% ammonium chloride, 10% zinc chloride, and 68% water. After one hour, the film showed a weight increase of 187% and after one week, its weight had increased 226%. The film had a resistivity of 0.185 ohm per square inch.

*Example III*

In accordance with another embodiment of the present invention, an ion exchange resin was incorporated into a thermoplastic resin to provide a cation exchange diaphragm. Specifically, one part by weight of polyethylene, and 0.5 part by weight of water soluble polyethylene oxide were intimately mixed under heat and pressure to produce a plasticized mass. Six parts by weight of impalpable polymeric methacrylic acid powder were then introduced into the plasticized resins and intimately mixed therewith. Following the intimate and homogeneous mixing of these materials, the plasticized mass was removed from the mill and calendered into sheet form. Following the sheeting, the polyethylene oxide was removed from the material in a water bath. Next, the porous sheet was immersed in an alkaline electrolyte and the ion exchange material converted in situ to its salt form. The elimination, by leaching, of the polyethylene oxide provided voids into which the ion exchange resin swelled during conversion from the acid to the salt form. This conversion was accomplished without any significant loss of the ion exchange constituent from the film. In this respect, it should be noted that where polyethylene alone is utilized to bind or incorporate the ion exchange deposit, there is a loss of the exchanger-constituent from the resin matrix during the equilibration process and the product will have neither the desired low final resistivity, nor the same degree of porosity.

With respect to the membrane of Example III, it should be noted that the ion exchange material constituted approximately 86% of the dry weight of the finished film. This represents a significant improvement over prior art membranes in which the amount of the ion exchange material so incorporated has been limited to about 75% of the total weight of the dry film in order to prevent the rupturing of the binding matrix by the swelling of the ion exchange material. Still further, the film of the present invention did not become brittle when dried. The improved characteristics can be attributed to the novel methods of the present invention which utilize a soluble thermoplastic resin phase as a temporary binder and pore forming agent. High loadings of ion exchange materials, as much as 90% of the total weight of the dry film, have been produced without a significant loss of flexibility or embrittlement upon drying.

*Example IV*

In the same manner as described in Example III, a cation ion exchange diaphragm or film was made by mixing one part by weight of polyethylene, one part by weight of polyethylene oxide, and 6 parts by weight of polystyrene sulphonic acid in finely divided form. The ion exchange diaphragm thus produced contained strongly acidic ion exchange material which can be converted to its salt form or maintained in its hydrogen form.

*Example V*

In the same manner as described in Example III, an ion exchange diaphragm or film was made by mixing one part by weight of polyethylene, one part by weight of polyethylene oxide, 6.5 parts by weight of a weakly basic polyamine type anion exchange resin. Upon the completion of the fabrication of the membrane, the ion exchange constituent was converted to its salt form in an acid electrolyte. Specifically, an immersion in a solution of hydrochloric acid produced the chloride form of the material and treatment in sulphuric acid converted the ion exchange constituent to its sulphate form.

*Example VI*

In the same manner as described in Example III, an ion exchange diaphragm or film was made by mixing one part by weight of polyethylene, one part by weight of polyethylene oxide, and 5.6 parts by weight of a strongly basic quaternary type amine ion exchange material. As was the case with the ion exchange constituent discussed in connection with Example IV, this ion exchange material may be converted to its salt form or maintained in its hydrogen form.

The porosity desired of an ion exchange membrane generally depends upon the use for which it is intended. For example, for storage battery applications, it is desirable that the diaphragm have low resistivity, and hence, high porosity. For electrodialysis where complete separation is required, the impermeability of the membrane must be carefully controlled. In the method of the present invention, the impermeability of a diaphragm is controlled by the ratio of the soluble resin phase to the insoluble resin phase. By means of the present invention, it is possible by properly proportioning this ratio to achieve a membrane in which the ion exchange material is distributed throughout the resin matrix in a manner approaching a continuous phase. This is achieved by utilizing the soluble resin phase in such amounts that the voids left upon its removal are such as to just accommodate the swelling which accompanies the conversion of the ion exchange resin in electrolyte. It has been found that for most ion exchange resins available commercially, this is achieved where the soluble resin phase is present in amounts of from about 0.1 to about 0.6 part by weight of the permanent resin phase. By providing interstitial voids in the permanent resin matrix to accommodate the swelling of the ion exchange material, it is possible to produce membranes which will not crack or become brittle upon drying.

*Example VII*

Fifty grams of polyethylene (Alathon 14) was mixed with 50 grams of polyethylene oxide (Polyox WSR-35) in a two roll rubber mill heated to 120° C. After mixing under heat and pressure for several minutes, the resins were transformed into a plasticized, viscous mass to which was added 1 gram of stearic acid (processing aid) and 300 grams of confectioners 10X sugar as a pore forming agent. After the sugar was thoroughly dispersed in the plasticized resins, the resin-sugar composition was calendered to form sheet material ranging in thickness from 10 to 12 mils. The calendering rolls were maintained at about 105° C.

The sheet material was immersed in cool tap water to remove a portion of the sugar and polyethylene oxide pore formers. The sheet material remained in the tap water until it floated, whereupon it was removed and washed in 2000 cc. of warm tap water containing 10 cc. of a wetting agent (Aerosol OT).

The resulting microporous resin product had an exceptionally high pore volume, though it did not appear to have a fibrous structure.

*Example VIII*

Fifty grams of polyethylene (DYNK) was mixed with 50 grams of polyethylene oxide (WSR-35) in a two roll rubber mill heated to 125° C. After mixing under heat and pressure for several minutes, the resins were transformed into a plasticized, viscous mass to which was added 1 gram of stearic acid (processing aid) and 400 grams of confectioners 10X sugar as a pore forming agent. After the sugar was thoroughly dispersed in the plasticized resins, the resin-sugar composition was calendered to form sheet material ranging in thickness from 10 to 12 mils. The calendering rolls were maintained at about 120° C.

The sheet material was immersed in cool tap water to remove a portion of the sugar and polyethylene oxide pore formers. The sheet material remained in the tap water until it floated, whereupon it was removed and washed in 2000 cc. of warm tap water containing 10 cc. of a wetting agent (Aerosol OT).

The resulting microporous product did not have a fibrous structure, but it did have an exceptionally high pore volume. The DYNK polyethylene has good oxidation resistance which makes it particularly useful as separator material in lead-acid batteries. The high pore volume of this microporous DYNK polyethylene resin is especially useful in lead-acid batteries of the maintenance-free type which require separators capable of containing large amounts of acid electrolyte.

The amount of filler material with which a given thermoplastic resin can be loaded depends primarily upon the physical properties, such as size, of the filler particles. As a general rule, it has been found that the amount of loading which can be achieved will increase as the size of the active material particles increase. In the foregoing discussion, the loadings given did not necessarily constitute the maximum degree of loading which can be achieved. The principal limitation in this connection is the ability to retain and mix the loaded resins in their plasticized states on a mill. It is possible to produce films in which the filler material constitutes as high as 90% of the total weight of the finished film.

Where it is desired, a conductive material such as graphite can be added to the plasticized mix in addition to the exchange resin. The resultant mixture may then be ground into fine pellets and utilized to make an ion exchange resin bed for water purification applications. The presence of graphite in the mix makes the porous pellets conductive and particularly suited for use in systems where the ion exchange material is regenerated electrolytically.

The novel methods of the present invention are also adapted for the production of microporous materials suited for medical and surgical uses. For example, by the method of the present invention, it is possible to produce microporous thermoplastic sheets having distributed therethrough medicaments of an antiseptic, insecticide or bactericide type. Generally speaking, there are two limitations upon the nature of powdered fillers which can be incorporated into microporous thermoplastic resins in accordance with the methods of the present invention. First, such fillers must be able to withstand the plasticizing temperatures of the resins without degradation, and secondly, they must be inert in the solvent utilized to remove the soluble resin phase, unless they are being used as an additional pore former as illustrated in Examples VII and VIII.

It is also within the scope of this invention to treat the plasticized thermoplastic resin composition containing additional pore forming material with more than one leaching solvent to remove the pore forming ingredients. For example, in some cases the additional pore forming material may not be soluble in the same leaching solvent used to remove the soluble thermoplastic resin, and so it will be necessary to treat the resin composition with a second sovent to remove the additional pore forming material. In such cases, either the soluble thermoplastic resin or the additional pore forming material may be removed first. It is also within the scope of this invention to treat the porous product, after removal of one or more pore forming materials, with a hydrophobic substance which will make the pore structure non-wetting.

Having completely described the nature of this invention, what is claimed is:

1. A method for preparing microporous materials by treating a thermoplastic resin composition with a solvent which comprises intimately mixing under heat and pressure a particulate thermoplastic resin which is insoluble in said solvent with a substantially incompatible, particulate thermoplastic resin which is soluble in said solvent and which is selected from the group consisting of polyethylene oxide, polyethylene glycol, and polyvinyl pyrrolidone to soften the resin into a plasticized mass, shaping the mass, and thereafter contacting the shaped mass with said solvent to remove substantially all of the soluble thermoplastic resin and thereby rendering the insoluble thermoplastic resin microporous.

2. A method in accordance with claim 1 in which the insoluble thermoplastic resin is polyethylene, the soluble thermoplastic resin is polyethylene oxide and the solvent is water.

3. A method in accordance with claim 1 in which one part by weight of the particulate thermoplastic resin which is insoluble in said solvent is mixed with from about 0.1 to about 0.6 part by weight of the substantially incompatible, particulate thermoplastic resin which is soluble in said solvent.

4. A method in accordance with claim 3 in which the insoluble thermoplastic resin is polyethylene, the soluble thermoplastic resin is polyethylene oxide and the solvent is water.

5. A method for preparing a microporous material containing an ion exchange resin by treating a thermoplastic resin composition with a solvent which comprises intimately mixing under heat and pressure a particulate thermoplastic resin which is insoluble in said solvent with a substantially incompatible, particulate thermoplastic resin which is soluble in said solvent to soften the resins into a plasticized mass, adding an ion exchange resin to the plasticized mass and dispersing the ion exchange resin throughout the plasticized mass, shaping the plasticized mass containing the ion exchange resin, and thereafter contacting the shaped mass with said solvent to remove substantially all of the soluble thermoplastic resin.

6. A method for preparing a microporous material containing an ion exchange resin by treating a thermoplastic resin composition with a solvent which comprises intimately mixing under heat and pressure one part by weight of a particulate thermoplastic resin which is insoluble in said solvent with from about 0.1 to about 0.6 part by weight of a substantially incompatible, particulate thermoplastic resin which is soluble in said solvent to soften the resins into a plasticized mass, adding an ion exchange resin insoluble in said solvent to the plasticized mass and dispersing the ion exchange resin throughout the plasticized mass, shaping the plasticized mass containing the ion exchange resin, contacting the shaped mass with said solvent to remove substantially all of the soluble thermoplastic resin from the mass, and thereafter converting the ion exchange resin to its salt form.

7. A method for preparing a microporous material containing an ion exchange resin by treating a thermoplastic resin composition with a solvent which comprises intimately mixing under heat and pressure one part by weight of a particulate thermoplastic resin which is insoluble in said solvent with from about 0.1 to about 0.6 part by weight of a substantially incompatible, particulate thermoplastic resin which is soluble in said solvent to soften the resins into a plasticized mass, adding an ion exchange resin insoluble in said solvent to the plasticized mass and dispersing the ion exchange resin throughout the plasticized mass, shaping the plasticized mass containing the ion exchange resin to form a sheet material, contacting the sheet material with said solvent to remove substantially all of the soluble thermoplastic resin, and thereafter converting the ion exchange resin to its salt form, said ion exchange resin being present in an amount sufficient to fill in its salt form substantially all of the voids in the sheet material created by the removal of the soluble thermoplastic resin.

8. A method for preparing a microporous material containing methylcellulose by treating a thermoplastic resin composition with a solvent which comprises intimately mixing under heat and pressure a particulate thermoplastic resin which is insoluble in said solvent with a substantially incompatible, particulate thermoplastic resin which is soluble in said solvent to soften the resins into a plasticized mass, adding methylcellulose to the plasticized mass and dispersing the methylcellulose throughout the plasticized mass, shaping the plasticized mass containing the methylcellulose and thereafter contacting the plasticized mass with said solvent to remove substantially all of the soluble thermoplastic resin.

9. A product made in accordance with the method of claim 5.

10. A product made in accordance with the method of claim 8.

11. A method for preparing microporous materials by treating a thermoplastic resin composition with water which comprises intimately dry mixing under heat and pressure a solid, particulate thermoplastic resin which is insoluble in water with a substantially incompatible, solid, particulate thermoplastic resin which is soluble in water to destroy the particulate nature of both resins and soften the resins into a plasticized, viscous mass, said dry mixing process being carried out in the absence of any plasticizers and solvents, shaping said mass, and thereafter contacting the shaped mass with water to remove substantially all of the soluble thermoplastic resin and thereby render the insoluble thermoplastic resin material microporous.

12. A method in accordance with claim 11 in which the insoluble thermoplastic resin is selected from the group consisting of polyethylene, polypropylene, polystyrene and polyvinyl chloride.

13. A product made in accordance with the method of claim 11.

14. A method for preparing a microporous material having an exceptionally large pore volume by treating a thermoplastic resin composition with a leaching solvent which comprises intimately dry mixing under heat and pressure a solid, particulate thermoplastic resin composition which is insoluble in said leaching solvent with a substantially incompatible, solid, particulate thermoplastic resin which is soluble in said leaching solvent to destroy the particulate nature of both resins and soften the resins into a plasticized, viscous mass, said dry mixing process being carried out in the absence of any plasticizers and solvents, adding a granular pore forming material selected from sugar and metallic salts to the plasticized resin mass and dispersing the pore forming material throughout the plasticized resin mass, shaping the plasticized resin mass containing the pore forming material, and thereafter contacting the shaped mass with a leaching solvent to remove substantially all of the soluble thermoplastic resin and the pore forming material.

15. A method in accordance with claim 14 in which the pore forming material is sugar.

16. A method in accordance with claim 14 in which the pore forming material is a metallic salt.

17. A product made in accordance with the method of claim 14.

18. A product made in accordance with the method of claim 15.

References Cited

UNITED STATES PATENTS

| | | | |
|---|---|---|---|
| 2,528,523 | 11/1950 | Kent | 18—47.5 |
| 2,681,319 | 6/1954 | Bodamer | 260—2.1 |
| 2,806,256 | 9/1957 | Smith-Johannsen | 18—57 |
| 3,104,985 | 9/1963 | Williams et al. | 117—226 |

WILLIAM H. SHORT, *Primary Examiner.*

M. GOLDSTEIN, *Assistant Examiner.*